Dec. 28, 1948.                B. G. CARLSON                2,457,206
              ROTARY VALVE FOR INTERNAL-COMBUSTION ENGINES
Filed March 16, 1945                                    2 Sheets-Sheet 1
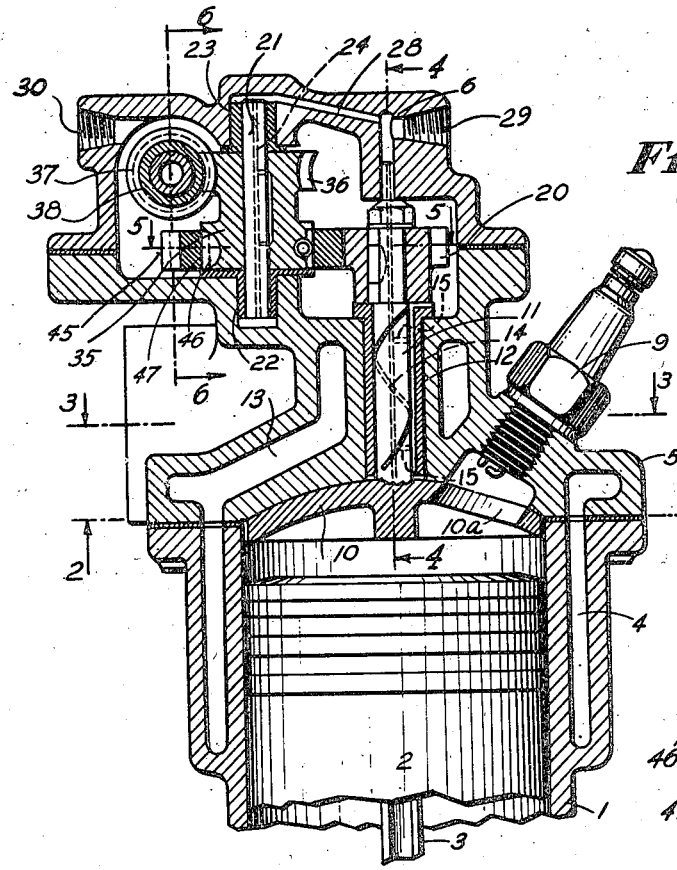
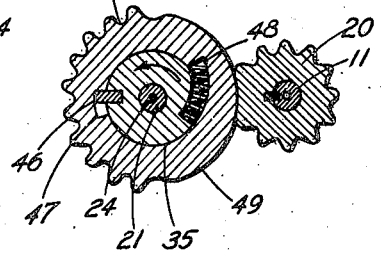
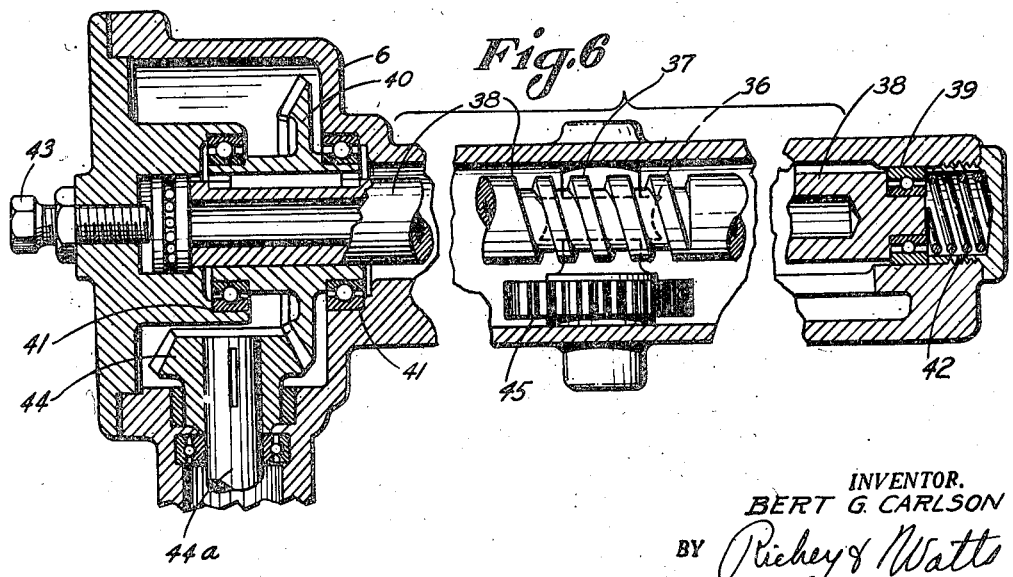
INVENTOR.
BERT G. CARLSON
BY *Richey & Watts*
ATTORNEYS Dec. 28, 1948.   B. G. CARLSON   2,457,206
ROTARY VALVE FOR INTERNAL-COMBUSTION ENGINES
Filed March 16, 1945   2 Sheets-Sheet 2

INVENTOR.
BERT G. CARLSON
BY Richey & Watts
ATTORNEYS

Patented Dec. 28, 1948

2,457,206

UNITED STATES PATENT OFFICE 2,457,206

ROTARY VALVE FOR INTERNAL-COMBUSTION ENGINES

Bert G. Carlson, Cleveland, Ohio

Application March 16, 1945, Serial No. 583,146

3 Claims. (Cl. 123—80)

1

The present invention relates to internal combustion engines and is particularly concerned with new rotary valve mechanism for such engines of the four-cycle type.

All prior rotary valves for controlling the admission of fuel into, and the exhaust gases out of, cylinders of internal combustion engines have rotated continuously, so far as I know. Such valves have not been entirely satisfactory for they soon scored and seized and, therefore, disabled the operation of the engine. I believe that these troubles were traceable to ingress of hard particles into the space between the relatively rotating valve parts under pressure and the resultant scoring of the valve parts.

The present invention is predicated on the idea that those disadvantages can be avoided by the use of rotary valves which rotate only when there is little or no pressure exerted thereon and which do not rotate when the pressure exerted thereon is substantial in amount. According to the present invention, the rotatable valve is intermittently actuated. It remains stationary during the compression and firing cycles and moves only during the intake and exhaust cycles.

The present invention will be better understood from the following description and the drawings which accompany and form a part of this specification and in which:

Figure 1 is a fragmentary sectional view taken transversely thru one cylinder of a multiple cylinder internal combustion engine equipped with one form of apparatus embodying the present invention;

Figure 5 is a fragmentary sectional view taken on line 5—5 of Fig. 1 and showing the mutilated gears for driving the rotary valve of Fig. 1; and, Figure 6 is a fragmentary vertical sectional view taken on line 6—6 of Fig. 1.

Figure 3:
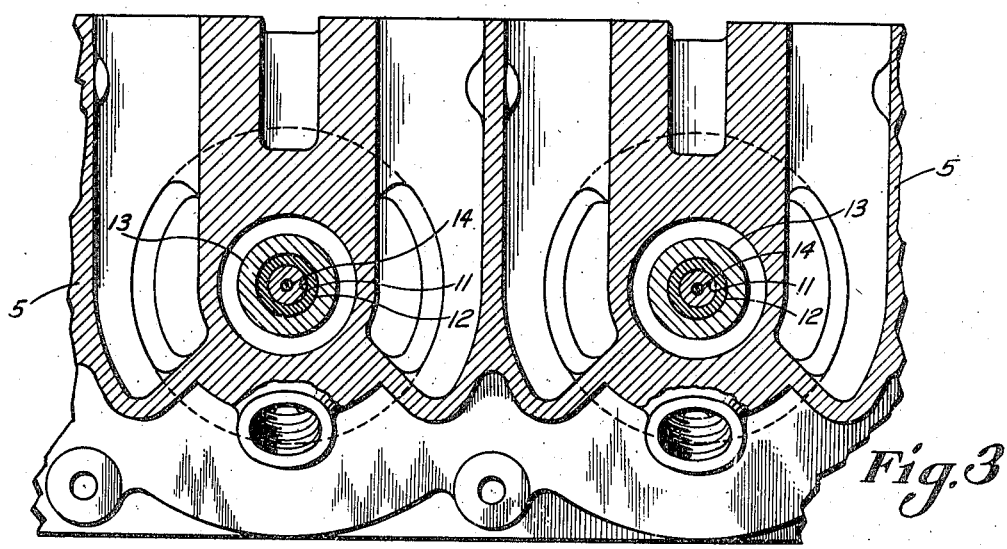
Figure 3 is a horizontal sectional view taken on line 3—3 of Fig. 1.

The engine, fragmentarily shown in the drawings, is a multicylinder, four-cycle, internal combustion engine, altho it will be understood that the invention is not limited to engines of any certain numbers of cylinders or to water cooled engines for the invention is applicable to engines having different numbers of cylinders and to air cooled as well as water cooled engines.

Figure 4:
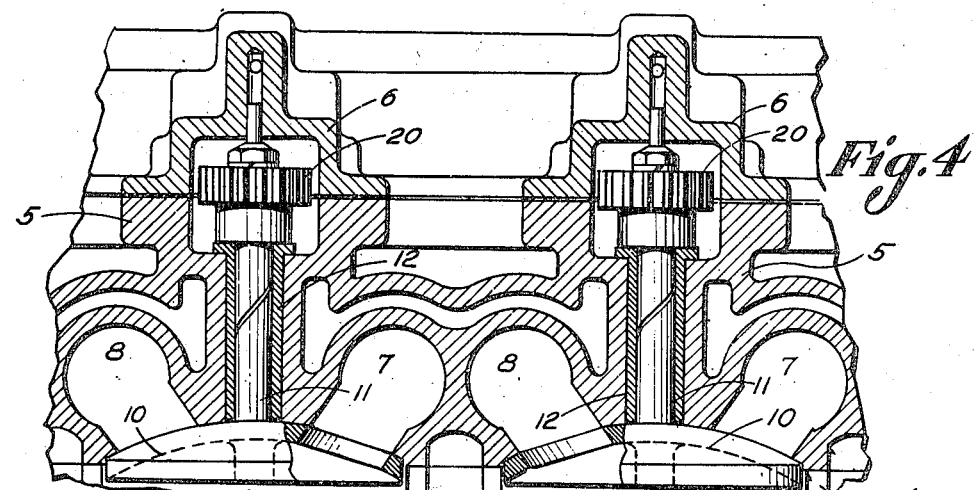
Figure 4 is a vertical sectional view taken on line 4—4 of Fig. 1.
Figure 2:
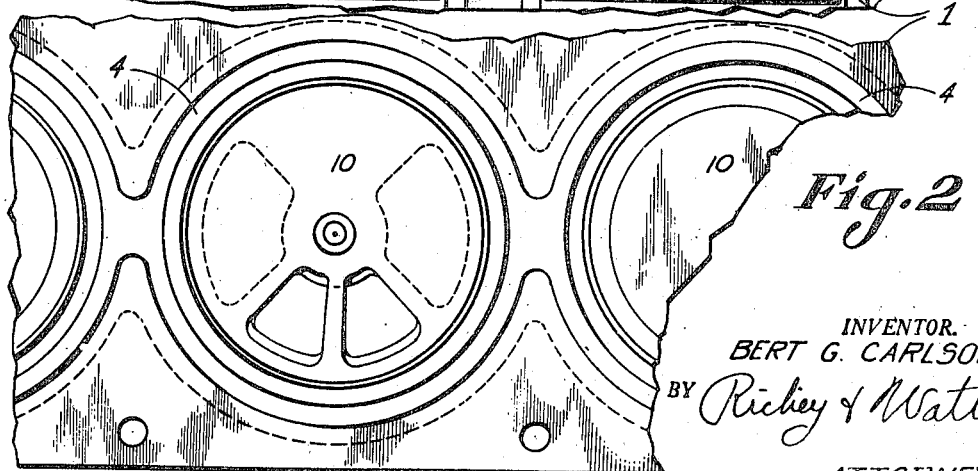
Figure 2 is a bottom plan view taken on line 2—2 of Fig. 1.

In the engine of the drawings, the cylinder 1 is equipped with the usual piston 2 which is connected to a crankshaft (not shown) by piston rod 3. The combustion end of cylinder 1 is provided with a surrounding space 4 thru which cooling fluid may be circulated in the usual manner. As is indicated in Figs. 2, 3 and 4, a plurality of cylinders 1 are arranged in line. A single head 5 is connected to a plurality of cylinders 1 and a cover 6 is attached to head 5.

The head 5 is equipped with an inlet passage 7 and an outlet passage 8 for each cylinder 1, and is also provided with a spark plug 9 for each cylinder 1. The surface of the head at the end of each cylinder is substantially spherical and bearing thereagainst is a rotary valve 10 which has a substantially spherical outer surface. This disk-like valve 10 is apertured as at 10a to connect, successively, the intake and exhaust passages 7 and 8 with the interior of cylinder 1 and also to expose the combustible charge in the cylinder to the igniting arc of plug 9. A shaft 11 extends axially from the valve disk 10 into head 5 where it is rotatably mounted in sleeve bearing 12 supported in the head. Head 5 is cored out to provide passages 13 for cooling fluid which may flow from passages 4 in cylinders 1 into the head around the valve disk 10 and bearing 12 to control the temperature of the rotary valve. Valve shaft 11 is bored out axially, as at 14, and radial passages 15 connect axial passage 14 with the exterior surface of shaft 11 for lubricating the latter and the opposing surface of bearing 12. It will be noted that some space is provided between the outer surface of disk 10 and the adjacent end of bearing 12. It will be understood that this space is provided primarily for ease in machining the outer surface of the disk and that engagement of the entire outer surface of the disk with the opposed wall of the head is not essential for complete sealing of these two parts against escape of gasses therebetween.

At the end of shaft 11, remote from disk 10, a mutilated gear 20 is keyed or otherwise attached to the shaft. Another shaft 21, substantially parallel to shaft 11, is mounted in sleeve bearings 22 and 23 seated in the head 5 and cover 6, respectively. Shaft 21 has an axial bore 24 extending from end to end thereof and the ends of the shaft are spaced a short distance away from the head and cover respectively. Radial passages 25 lead from the axial passage 24 to the exterior surface of the shaft. Passages 27 and 28 formed in cover 6 lead from an oil inlet opening 29 to the passage 14 in shaft 11 and to passage 24 in shaft 21. Oil under pressure may be passed thru these passages to lubricate the exterior surfaces of both shafts. After passing thru these passages and out of the bearings of shafts 11 and 21, the oil may flow thru opening 30 and back to the oil pump of the engine. It will be understood that the gear spaces in head 5 and cover 6 may be kept full of oil and that the gears are actually submerged in oil while the engine is operating.

Shaft 21 extends thru and is keyed to a member 35. This member has, at one end, a worm gear 36 which engages with a worm 37 keyed to shaft 38. This shaft 38 (Fig. 6) is supported at one end by bearing 39 and at the other end by gear 40, which is mounted in bearings 41. Spring 42 and adjusting screw 43 press against opposite ends of shaft 38 and serve to shift it axially, there being a spline connection between the shaft and gear 40 which permits such axial movement relative to gear 40. Gear 40 meshes with a gear 44 keyed to drive shaft 44a which is driven at one-half (½) the speed of the crankshaft by any suitable connection to the crankshaft. The timing of the valves 10 may be varied by shifting shaft 38 axially and thereby advancing or retracting gears 36 which mesh therewith.

Member 35 on shaft 21 has a circular portion 49 with which mutilated gear 45 is operatively associated. A driving key 46 mounted in member 35 is movable in an arcuate slot 47 in gear 45. A spring 48 seats in sockets in member 35 and gear 45 and serves to cushion the shock incident to engagement of the teeth of gears 20 and 45.

As will be seen from Fig. 6, mutilated gears 20 and 45 have the same number of teeth but since gear 45 is considerably larger in diameter than gear 20 the mutilated part 49 of gear 45 is much longer circumferentially than the mutilated part 50 of gear 20. By reason of the relative diameters of these two gears and the relative circumferential lengths of mutilated portions 49 and 50, gear 20 and the valve disk 10 attached thereto will be rotated thru one complete revolution while gear 45 is rotating thru one-half revolution and gear 20 will dwell while gear 45 completes the remainder of its revolution. Thus, it will be seen that for each second revolution of the crankshaft, the valve disk 10 will make a complete revolution and will not be rotated during the alternate revolution of the crankshaft. In this manner the valve disk is caused to dwell during the compression and firing cycles of the engine when the pressure on the valve is high and to rotate thru the exhaust and intake strokes when the pressure on the disk is slight. Since the valve is not rotated during the high pressure cycles, but only during the low pressure cycles, there is little or no tendency for hard, unburned solids that may come between the outer surface of the valve and the inner surface of the head to cause scoring of one or the other, or both, of these surfaces. Furthermore, the frictional forces are very low because the valve is not rotated when the pressures thereon are high.

The operation of the above described apparatus will be clear to those skilled in the art from the foregoing description and the following consideration of Fig. 2. That figure shows the valve 10 in the position it occupies during the compression and firing cycles. The disk dwells in that position throughout the time mutilated portion 49 of gear 45 is moving past mutilated portion 50 of gear 20. Gear 45 is timed so that near the end of the firing cycle the first tooth following the mutilated portion 49 of gear 45 will engage with the end of mutilated portion 50 on gear 20. Continued rotation of gear 50 will rotate the disk so that openings 10a therethru will first pass between the cylinder and its exhaust port, thereby permitting escape of the waste gases, then openings 10a will pass beyond the exhaust port and connect the intakes port with the cylinder, thereby permitting entry of a new combustible charge. Near the beginning of the compression cycle the disk will have closed the communication between the cylinder and intake port and will be in the position shown in Fig. 2, with the passages 10a exposing the spark plug 9 to the charge in the cylinder. At that time the last tooth on gear 45 will have left the last tooth on gear 20 and the mutilated portions 49 and 50 of these gears will be bearing against each other. Thus, it will be clear that the valve rotates only during the low pressure exhaust and intake cycles and dwells during the high pressure compression and firing cycles.

While only one form of the present invention has been shown in the drawings, it will be understood by those skilled in the art that various structural changes may be made without departing from the spirit of the invention. For instance, the valve disk may be flat instead of a segment of a sphere and may take various other shapes which are suitable for making a good seal with the engine head. Also, the illustrated operating mechanism of mutilated gears may be replaced by any apparatus equivalent thereto in the sense that it will rotate the valve during the exhaust and intake cycles and cause it to dwell during the compression and firing cycle. As stated hereinbefore, the engine may be air cooled or liquid cooled and may consist of various numbers of cylinders. Other similar changes may be made by those skilled in the art but further illustrations are believed to be unnecessary.

Engines embodying the present invention possess many important advantages. The single rotating valve for each cylinder eliminates the two valves per cylinder of poppet valve engines together with their springs and push rods, and displaces the rotating or reciprocating sleeves of sleeve valve engines, together with their requirement of adequate clearances at high temperatures and consequent low efficiencies at low temperatures. The present valve is considerably simpler and less costly to manufacture than poppet or sleeve valves. The present valve is not operated under any appreciable torque and the friction incident to its operation is extremely low, for its operating mechanism is submerged in oil under pressure. The valve disk does not require any lubrication during the compression and explosion cycles, it does not move, and while rotating during the exhaust and intake cycles the oil under pressure minimizes its frictional loading. The present valve does not require such exact fits as are necessary in sleeve or poppet valve construction and its fits are not appreciable affected by temperature changes. Since the disk seats against the head, the compression in the cylinder increases the effectiveness of the sealing action of the disk on the head and temperature changes have no effect on the effectiveness of the seal. The present valve is not impeded in its free operation by unburned carbon particles, dirt and the like, and there is substantially no dilution of the gases with oil entering the combustion chamber about the valve and consequently substantially no carbon produced by reason of such dilution.

The valve construction including its operating mechanism of the present invention involves but few parts and each of those parts are simple to make and may be substantial in size and therefore rugged and of long operating life. No fragile, small, or delicate parts are required and no part requires extreme accuracy in manufacture.

The valve of this invention lends itself generally to better balanced engine cooling with little or no complication either in cooling or manufacture. It may be used in either liquid cooled or air cooled engines. Moreover, it is able to withstand high engine temperatures without loss of efficiency and is equally efficient in engines operating at low temperatures. This invention permits higher compression ratios in shorter stroke engines than are possible in poppet valve engines and in high compression engines, less overtaxing of the parts and less warping in excessive heats. These advantages are in part traceable to the fact that the valve is constantly under balanced pressures.

Engines embodying the present invention require but few alignments of component parts. The small number of concentricities involved permits the use of fewer, simpler parts and greater tolerances. All these factors tend to make an engine equipped with the present invention less expensive to manufacture, easier to service, and longer in service life.

The present invention also permits greatly increased supercharger ratios because of the larger effective port areas and the better control over the flow of gases. Hot spots in the combustion chamber are reduced because of the improved turbulence of the gas mixture and smoother running and greater fuel economy is attained by the shape of the combustion chamber and more accurate, positive timing. Assembly and disassembly of the valve is simplified and valve timing may be accomplished from the exterior of the engine while it is running.

Having thus described my invention so that others skilled in the art may be able to understand and practice the same, I state that what I desire to secure by Letters Patent is defined in what is claimed.

What is claimed is:

1. In an internal combustion engine having a cylinder and a piston, the combination of a head having one inlet port and one exhaust port, a rotary valve in said cylinder having a passage therethrough registrable with said ports successively and one at a time, and means operatively associated with said valve for rotating it at a constant speed through one complete revolution and moving said passage successively past said exhaust and inlet ports during the exhaust and intake cycles of the engine and then causing the valve to dwell during the compression and firing cycles of the engine.

2. In an internal combustion engine having a cylinder, a piston and a crankshaft, the combination of a head having an inlet port and an exhaust port, a rotary disk valve in said cylinder and having a passage therethrough registrable with said ports successively and one at a time, a shaft extending from said disk into said head, a bearing carried by said head and surrounding said shaft, a mutilated gear keyed to said shaft and having teeth extending throughout the major portion of its periphery and having a dwell portion relatively short as compared with the length of the toothed portion, and means for rotating said shaft and disk through one complete revolution and at a constant speed during only the intake and exhaust cycles of said engine, said means including a shaft driven at one-half the rotational speed of said crankshaft and a mutilated gear driven by said driven shaft, said gear having teeth along only approximately one-half of its peripheral length to engage and drive the mutilated gear on the disk shaft and having a dwell portion extending along the remainder of its peripheral length, the second said mutilated gear serving during one-half of its revolution to rotate the first said mutilated gear and the rotary valve through one complete revolution and during the next half of its revolution to permit the first said gear and the valve to dwell.

3. In an internal combustion engine having a cylinder and a piston, the combination of a head having an inlet port and an exhaust port, a rotary valve disk in said cylinder and having a passage therethrough registrable with said ports successively and one at a time, a shaft extending from said disk into said head, and means in said head for intermittently rotating said shaft and disk through one complete revolution at a constant speed and then permitting it to dwell, said means including a mutilated gear on said valve shaft having teeth along the major portion of its perimeter and a relatively short dwell surface, a mutilated continuously driven gear having teeth along substantially only one-half of its perimeter and a dwell surface along the remainder of its perimeter, said driven gear engaging with the first said gear for driving the latter through one complete revolution during one-half revolution of the driven gear, and a shaft for driving the said driven gear at one-half the rotational speed of the engine crankshaft.

BERT G. CARLSON.

REFERENCES CITED

The following references are of record in the file of this patent:

UNITED STATES PATENTS

| Number | Name | Date |
|---|---|---|
| 646,652 | Washington | Apr. 3, 1900 |
| 813,204 | Frayer et al. | Feb. 20, 1906 |
| Re. 13,368 | Mead | Feb. 13, 1912 |
| 1,147,023 | Holmquest | July 20, 1915 |
| 1,159,553 | VanKeuren | Nov. 9, 1915 |
| 1,189,281 | Mueller et al. | July 4, 1916 |
| 1,240,126 | Dubois | Sept. 11, 1917 |
| 1,308,466 | Williams | July 1, 1919 |
| 1,431,188 | Sinclair | Oct. 10, 1922 |
| 1,539,041 | Crawford | May 26, 1925 |

FOREIGN PATENTS

| Number | Country | Date |
|---|---|---|
| 57,217 | Germany | June 17, 1891 |
| 425,858 | France | Sept. 25, 1911 |